United States Patent
Hunukumbure et al.

(10) Patent No.: US 9,877,247 B2
(45) Date of Patent: Jan. 23, 2018

(54) GROUP HANDOVER WITH MOVING CELLS

(71) Applicant: FUJITSU LIMITED, Kawasaki-shi, Kanagawa (JP)

(72) Inventors: Rajaguru Mudiyanselage Mythri Hunukumbure, Hillingdon (GB); Hui Xiao, West Drayton Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/448,252

(22) Filed: Mar. 2, 2017

(65) Prior Publication Data

US 2017/0311216 A1    Oct. 26, 2017

(30) Foreign Application Priority Data

Mar. 16, 2016 (GB) .................... 1604456.2

(51) Int. Cl.
*H04W 36/00* (2009.01)
*H04W 36/04* (2009.01)
(Continued)

(52) U.S. Cl.
CPC .......... *H04W 36/04* (2013.01); *H04L 67/306* (2013.01); *H04W 4/046* (2013.01); *H04W 88/12* (2013.01)

(58) Field of Classification Search
USPC .......... 455/437, 456.1, 444, 440; 340/539.13
See application file for complete search history.

(56) References Cited

U.S. PATENT DOCUMENTS

| 2004/0058678 A1* | 3/2004 | deTorbal ............... H04W 36/32 455/437 |
| 2007/0024440 A1* | 2/2007 | Moran ................... G08G 1/127 340/539.13 |

(Continued)

FOREIGN PATENT DOCUMENTS

| EP | 2 911 447 A1 | 8/2015 |
| JP | 2005-252623 A | 9/2005 |

(Continued)

OTHER PUBLICATIONS

Namal, S., et al., "Realization of Mobile Femtocells: Operational and Protocol Requirements," Wireless Personal Communications, vol. 71, Issue 1, pp. 339-364, Jul. 2013.

(Continued)

*Primary Examiner* — David Q Nguyen
(74) *Attorney, Agent, or Firm* — Arent Fox LLP

(57) ABSTRACT

A wireless communication system using cells to provide wireless access to services, comprising a first base station installed on board a public transportation vehicle to provide a moving cell, and a second base station installed at a stop at which users enter or leave the vehicle, to provide a fixed cell. A central controller guides handovers of users entering or leaving the vehicle. The first and second base stations to provide data concerning users to the central controller, and the central controller, over many journeys of the vehicle, gathers profile data of users based on the data provided by the base stations. As the vehicle approaches a stop, the central controller makes predictions about users likely to enter and leave the vehicle, and, provides guidance to the first and second base stations for performing handovers.

15 Claims, 5 Drawing Sheets

(51) Int. Cl.
*H04L 29/08* (2006.01)
*H04W 4/04* (2009.01)
*H04W 88/12* (2009.01)

(56) References Cited

U.S. PATENT DOCUMENTS

| | | |
|---|---|---|
| 2007/0121549 A1 | 5/2007 | Yun et al. |
| 2009/0047963 A1 | 2/2009 | Kim |
| 2011/0059741 A1 | 3/2011 | Klein |
| 2011/0217947 A1 | 9/2011 | Czaja et al. |
| 2012/0129532 A1* | 5/2012 | Lim ............ H04W 36/32 455/437 |
| 2014/0073330 A1 | 3/2014 | Pan et al. |
| 2014/0355565 A1 | 12/2014 | Hayes et al. |
| 2014/0355566 A1 | 12/2014 | Walley et al. |
| 2015/0031372 A1* | 1/2015 | Foerster ............ H04W 48/20 455/444 |
| 2015/0065146 A1* | 3/2015 | Wenger ............ H04W 36/32 455/440 |
| 2016/0142880 A1* | 5/2016 | Talluri ............ H04W 4/025 455/456.1 |

FOREIGN PATENT DOCUMENTS

| | | |
|---|---|---|
| JP | 2010-226468 A | 10/2010 |
| KR | 10-2013-0139480 A | 12/2013 |
| WO | WO 2005/089413 A2 | 9/2005 |
| WO | WO 2014/124894 A1 | 8/2014 |

OTHER PUBLICATIONS

Becker, R. A., et al., "Route Classification Using Cellular Handoff Patterns," AT&T Labs—Research, ACM, 2011.
Daoui, M., et al., "Movement Prediction in Cellular Network," In: Forecasting Models Methods and Applications, iConcept Press, Chapter 15, pp. 221-232, Jun. 2010.
Amirrudin, N., et al., "Mobility Prediction via Markov Model in LTE Femtocell," International Journal of Computer Applications (0975-8887), vol. 65, No. 18, Mar. 2013.
Kim, T., et al., "Handover Optimization with User Mobility Prediction for Femtocell-based Wireless Networks," International Journal of Engineering and Technology (IJET), vol. 5, No. 2, Apr.-May 2013.
Smrati, et al., "Group Handover Management in Mobile Femtocell Network Based on Art Map Class1," International Journal of Scientific & Engineering Research, vol. 4, Issue 8, Aug. 2013.
Kuruvatti, N. P., et al., "Exploiting Diurnal User Mobility for Predicting Cell Transitions," Globecom Workshops (GC Wkshps), IEEE, Dec. 9-13, 2013.
Tyrrell, A., et al., "The BeFEMTO System Architecture," INFSO-ICT-248523 Broadband evolved FEMTO Networks, D2.2, Version 1.0, 2010.
"Broadband evolved FEMTO Networks," FP7 ICT Objective 1.1, BeFEMTO, Jan. 2010.
Haider, F., et al., "A Simulation Based Study of Mobile Femtocell Assisted LTE Networks," Wireless Communications and Mobile Computing Conference (IWCMC), 2011 7th International, IEEE, 2011.
Ananthi, J., et al., "A Review: On Mobility Prediction for Wireless Networks," International Journal of Emerging Technology and Advanced Engineering, vol. 3, Issue 4, Apr. 2013.
Bergh, A. E., et al., "Prediction Assisted Fast Handovers for Mobile IPv6," IEEE MILCOM, 2006.
British Search Report of related British Patent Application No. GB1604456.2 dated Aug. 2, 2016.

* cited by examiner

| User ID | cell ID | start time | end time | service(s) |
|---|---|---|---|---|
| nnnnn | B00001 | 8:25:32 | 8:55:13 | e-mail |
| ppppp | B00001 | 8:25:44 | 9:10:45 | video stream |
| qqqqq | B00001 | 8:54:55 | 9:10:32 | online game |
| nnnnn | S00001 | 8:55:16 | 9:20:39 | e-mail |
| ppppp | S00002 | 9:10:52 | 9:23:42 | connected |

US 9,877,247 B2

GROUP HANDOVER WITH MOVING CELLS

CROSS-REFERENCE TO RELATED APPLICATIONS

This application claims priority to British Patent Application No. 1604456.2, filed Mar. 16, 2016. The disclosure of the priority application is incorporated in its entirety herein by reference.

FIELD OF THE INVENTION

This invention generally relates to cellular wireless communication systems, more particularly to systems in which at least some of the cells are provided on moving vehicles, and to a handover method in such systems.

BACKGROUND OF THE INVENTION

Wireless communication systems are widely known in which subscriber stations communicate wirelessly using cells provided by base stations. As users move around there is a requirement for handover of the users from one cell to another, that is to say from a first base station (source base station) to a second base station (destination base station).

Current, "4G", wireless communication systems include systems based on the set of standards developed by 3GPP and referred to as LTE or LTE-A, in which the users are referred to as UEs (User Equipments) and the base stations as eNBs (enhanced Node Bs). Mobility management functions in LTE networks for UEs in connected mode handle all necessary steps for handover. These steps include processes that precede the final HO handover decision on the source network side (control and evaluation of UE and eNB measurements), preparation of resources on the target network side, notifying the UE of the new radio resources and finally releasing resources on the source network side. Handover of UEs also involves transferring, from one eNB to another, all the information related to the UE, called its "context".

A typical handover procedure in LTE networks, taken from 3GPP TS36.300, is illustrated in FIG. 7, showing three phases of handover respectively labelled "Preparation", "Execution" and "Completion", and illustrating the signalling which occurs between a UE being handed over, source and target eNBs, a Mobility Management Entity (MME), and a Serving Gateway (S-GW).

Suppose that a connected-mode UE is connected to a Source eNB providing a serving cell, and can receive at least reference signals from a neighbour cell provided by a Target eNB. In a step 1. "Measurement Control", the UE is triggered to send measurement report by the rules set by system information, specification etc. (see 3GPP TS36.331). In a step 2. "Measurement Reports", UE performs measurements of attributes of the serving and neighbour cells. Step 3 "HO decision" is for Source eNB to make a decision based on measurement report and RRM information to hand over the UE. Then, (4. "Handover Request") the Source eNB issues a handover request to the Target eNB, passing necessary information to prepare the handover at the target side. In a step 5. "Admission Control", admission control may be performed by the Target eNB to determine whether or not it agrees to accept the UE. Then (6. "Handover Request Ack.") the Target eNB 11 prepares the HO and sends the handover request Ack. to the Source eNB, in which a handover command is included for the Source eNB to forward the command in the form of a message labelled "7. RRC Conn. Reconf.mobilityControlinfo", to instruct the UE to connect to the target cell.

Several necessary steps are performed on the network side to ensure a lossless user plane path switch, in other words minimum interruption in the data packets being transmitted to or from the UE. These include a step 8. "SN Status Transfer" by which the Source eNB informs the Target eNB of the Sequence Number (SN) up to which it has successfully delivered data packets, in order for the Target eNB to know at which packet to start transmission.

After receiving the handover command, UE performs synchronisation to Target eNB (9. "Synchronization") and accesses the target cell. The Target eNB responds (10. "UL Allocation+TA for UE") with an uplink allocation and timing advance. When the UE has successfully accessed the target cell, the UE sends a message (11. "RRC Connection Reconfiguration Complete") to the Target eNB to confirm the completion of handover.

The subsequent steps 12.-15. in FIG. 7 can be summarised as a user plane path switch, which changes the DL user plane data delivery path from the path: S-GW→Source eNB to: S-GW→Target eNB. Finally, the MME confirms (16. Path Switch Req. Ack) the handover and the Target eNB then sends a message (17. "UE Context Release") to instruct the Source eNB to release the resources previously allocated to the handed-over UE.

As will be understood, the above handover process is considerably involved and requires a considerable amount of signalling to be exchanged among the UE, eNBs, MME and S-GW. FIG. 7 illustrates a handover of a single UE but the same eNBs may need to hand over multiple UEs at the same time. This is possible if the required control signalling is carried in different radio resources for each UE. Generally, handovers are conducted on a "first come, first served" basis.

Next generation wireless communications systems such as so-called "5G" aim to offer improved services to the user compared to the existing systems. These systems are expected to offer high data rate services for the processing and transmission of a wide range of information, such as voice, video and IP multimedia data.

To meet this expectation, 5G networks will employ "small cells" as an indispensable part of the 5G landscape. Small cells have already been proposed for use in fixed locations in homes, offices and public spaces as an addition to conventional, "macro" cells, for example to fill in coverage holes in the macro cell network and provide localised capacity hotspots. However, 5G networks are also likely to include small cells mounted on moving public transportation vehicles to enhance the coverage, capacity and service quality for the in-vehicle mobile users and to reduce the environmental impact of mobile communication systems by deploying wireless access nodes close to where users are. Such small cells mounted inside vehicles will henceforth be referred to as "moving cells". Both fixed and moving small cells can be managed in an operator-neutral way (Small Cells as a Service, SCaaS), to avoid unnecessary duplication of hardware.

Taking a bus as an example of a moving public transportation vehicle, user equipments (UEs) inside the bus will connect to an inside base station/access point instead of to outside macro- or small cells, and a transceiver will be placed outside the bus for transmitting/receiving data to/from the macro-cell providing the wireless backhaul to the core network. When stopped at a bus stop, the transceiver may further be able to co-operate with small cells in the vicinity, such as a small cell of a femto base station provided at each bus stop. Thus better signal quality and high data rate can be provided to the in-vehicle UEs to satisfy their needs for various mobile data services including those having rigorous requirements on latency emerging in the 5G era.

There are several issues that need to be addressed for this moving cell scenario, such as the management of handovers that occur when passengers get on/off the bus at bus stops. As will be appreciated from the above discussion of a conventional handover, if many users get on or off a public transportation vehicle at the same time and attempt to perform handover, the result will be a high signalling load on the network and increased latency experienced by the users.

SUMMARY OF THE INVENTION

According to a first aspect of the present invention, there is provided a wireless communication system using cells to provide wireless access of users to services, comprising:
- a first base station installed on board a public transportation vehicle, to provide a moving cell;
- at least one second base station installed at a stop at which users enter or leave the vehicle, to provide one or more fixed cells; and
- a central controller for guiding handovers of users entering or leaving the vehicle; wherein the first and second base stations are arranged to provide data concerning users to the central controller, and the central controller is arranged to gather profile data of users based on the data provided by the base stations, make predictions about which users are likely to enter and leave the vehicle at the stop, and based on the predictions, to provide guidance to the first and second base stations for performing handovers of the users.

Here, "public transportation vehicle" refers to a mode of transport such as a bus, train or tram carrying several persons each of whom may be a user of the wireless communication system. The "stop" at which users enter or leave the vehicle may be a bus stop, train station or the like.

Preferably, the central controller is arranged to gather the profile data of users by recording details provided by the first and second base stations of wireless accesses of each user to the moving cell and/or fixed cells during a plurality of journeys using the public transportation vehicle (or similar such vehicles). In other words the profile data is built up over time based on past history of users' journeys. Such details can include:
- at least one identity of the user;
- the time the user established a connection with the moving or fixed cells; and
- the time the user ended the connection with the moving or fixed cells.

Here, "identity of the user" can include an identifying code of the user's mobile device, and/or an ID code contained in an RFID (Radio Frequency IDentification) device installed either in the mobile device or on the user's person.

Further details recorded by the central controller may include information identifying a service or services which the moving or fixed cells provide to the user.

The guidance provided by the central controller preferably includes a number of handovers from the moving cell to the fixed cells and from the fixed cells to the moving cell, which the central controller predicts will be needed when users enter and leave the vehicle at the stop.

The guidance provided by the central controller may also include an indication of resources predicted to be freed up from the moving cell and the fixed cells as a result of the predicted handovers. The central controller may further provide an indication of which fixed cell is selected as a handover target cell for a user which is leaving the vehicle, and/or an indication of resource allocations predicted to be needed in the moving cell and the fixed cells after users have entered and left the vehicle at the stop.

The details provided by the first and second base station preferably include information identifying at least one type of service which the moving or fixed cells provide to the user, in which case, preferably, the central controller is arranged to predict whether the user is likely to continue to require wireless access to the service after leaving or entering the vehicle, and the indication of resource allocations takes into account resource demands of the service.

The first base station, installed on board the public transportation vehicle, preferably updates the central controller with the position of the public transportation vehicle, so that the central controller is able to provide said guidance prior to the vehicle reaching the stop.

By using the guidance provided by the central controller, the first and second base stations may perform the handovers without a need for the handovers to be triggered by measurement reports from the users.

More particularly, handovers may be performed on the basis of one or more of:
- guidance from the central controller regarding which users are predicted to enter or leave the vehicle;
- recent handovers of other users during the same journey of the vehicle;
- past handovers of the same user during earlier journeys on the vehicle;
- measurements of the fixed cell by the first base station; and
- historical measurement reports of the users.

Handovers may be further guided by information gathered by an RFID reader of the vehicle, if available.

According to a second aspect of the present invention, there is provided a central controller for wireless communication system using cells to provide wireless access of users to services, the wireless communication system comprising a first base station installed on board a public transportation vehicle, to provide a moving cell; and at least one second base station installed at a stop at which users enter or leave the vehicle, to provide one or more fixed cells; wherein
  the central controller is arranged to receive data concerning the users from at least the first base station, gather profile data of the users based on the data so received, make predictions about which users are likely to enter and leave the vehicle at the stop, and based on the predictions, to provide guidance to the first and second base stations for performing handovers of the users.

According to a third aspect of the present invention, there is provided a method of controlling a wireless communication system, the wireless communication system using cells to provide wireless access of users to services and comprising a first base station installed on board a public transportation vehicle to provide a moving cell and at least one second base station installed at a stop at which users enter or leave the vehicle, to provide one or more fixed cells, wherein the method comprises steps of:
- receiving data concerning the users from at least the first base station;
- gathering profile data of the users based on the data received;
- making predictions about which users are likely to enter and leave the vehicle at the stop, and based on the predictions, providing guidance to the first and second base stations for performing handovers of the users.

According to a further aspect of the present invention, there is provided software which, when executed by a general-purpose computer, provides the central controller as defined above. Such software may be stored on a computer-readable medium.

Embodiments of the present invention differ from previous proposals in this area in features including the following.

Group handover conditions arising in a moving cell are addressed by making predictions about a group of users, specifically in a moving cell and by accounting for the bi-directional movement of users at a bus/train stop.

A network oriented solution is proposed, which has a holistic view of the multiple destination cells based on previously reported values to determine what level of capacity will be freed and what level of QoS can be provided.

A travel route prediction method is provided, based on the statistical analysis on the likelihood of a UE getting off at a certain stop or station when taking a particular route by public transport, which builds up the UE's travel profile over time using the UE's connection and disconnection events with the in-vehicle femtocells of different public transportation vehicles that the UE take and the route and station information of different vehicles.

The prediction method calculates the likelihood of a UE getting off at a certain station based on the UE's historical travel behaviours to predict the travel destination for the UE.

The prediction method can use a UE's historical travel data on a particular journey (e.g., bus route) to predict the likelihood that the UE gets off at a certain station. That is, a UE's connection and disconnection events with in-vehicle femtocells and vehicle route and station information may be employed to predict the likelihood that the UE gets off at a certain station.

A centralized solution is provided, which can have a holistic view of available resources from the surrounding fixed cells at a stop or station. It can be assumed that in a densely deployed heterogeneous network there are multiple cells that can provide coverage in the area of the stop or station, and the fixed cells can be virtual cells.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between a network and terminals in a wireless communication system. In a wireless communication system, typically, wireless access to the network is provided by one or more base stations or access points. Such a base station may take any form suitable for transmitting and receiving such signals. It is envisaged that the base stations will typically take the form proposed for implementation in the 3GPP LTE and 3GPP LTE-A groups of standards, and may therefore be described as an eNB (eNodeB) (which term also embraces Home eNB or HeNB) as appropriate in different situations. However, subject to the functional requirements of the invention, some or all base stations may take any other form suitable for transmitting and receiving signals from user equipments.

Similarly, in the present invention, each terminal may take any form suitable for transmitting and receiving signals from base stations. For example, the subscriber station may be referred to as a user equipment (UE) or mobile station (MS), and may take any suitable fixed-position or movable form. For the purpose of visualising the invention, it may be convenient to imagine the terminal as a mobile handset (and in many instances at least some of the user equipments will comprise mobile handsets), however no limitation whatsoever is to be implied from this. In the detailed description which follows, in which embodiments of the present invention are described with respect to LTE by way of example, the terminal is referred to as a UE in accordance with usual LTE terminology.

Incidentally, the terms "user", "commuter" and "passenger" are used interchangeably below and refer to users of the wireless communication network (in other words, users carrying a mobile device which is switched on). References to users and passengers also include the mobile devices (terminals) of such users unless otherwise demanded by the context.

BRIEF DESCRIPTION OF THE DRAWINGS

Reference is made, by way of example only, to the accompanying drawings in which.

DETAILED DESCRIPTION

Embodiments of the present invention will now be described by referring to buses as an example of public transportation vehicles to which the present invention can be applied. It will be understood, however, that this is merely an example and that the present invention can be applied to various transportation systems involving users riding in vehicles and entering/leaving the vehicles at predetermined stations or stops. This includes railway and tram services for example.

Figure 1:
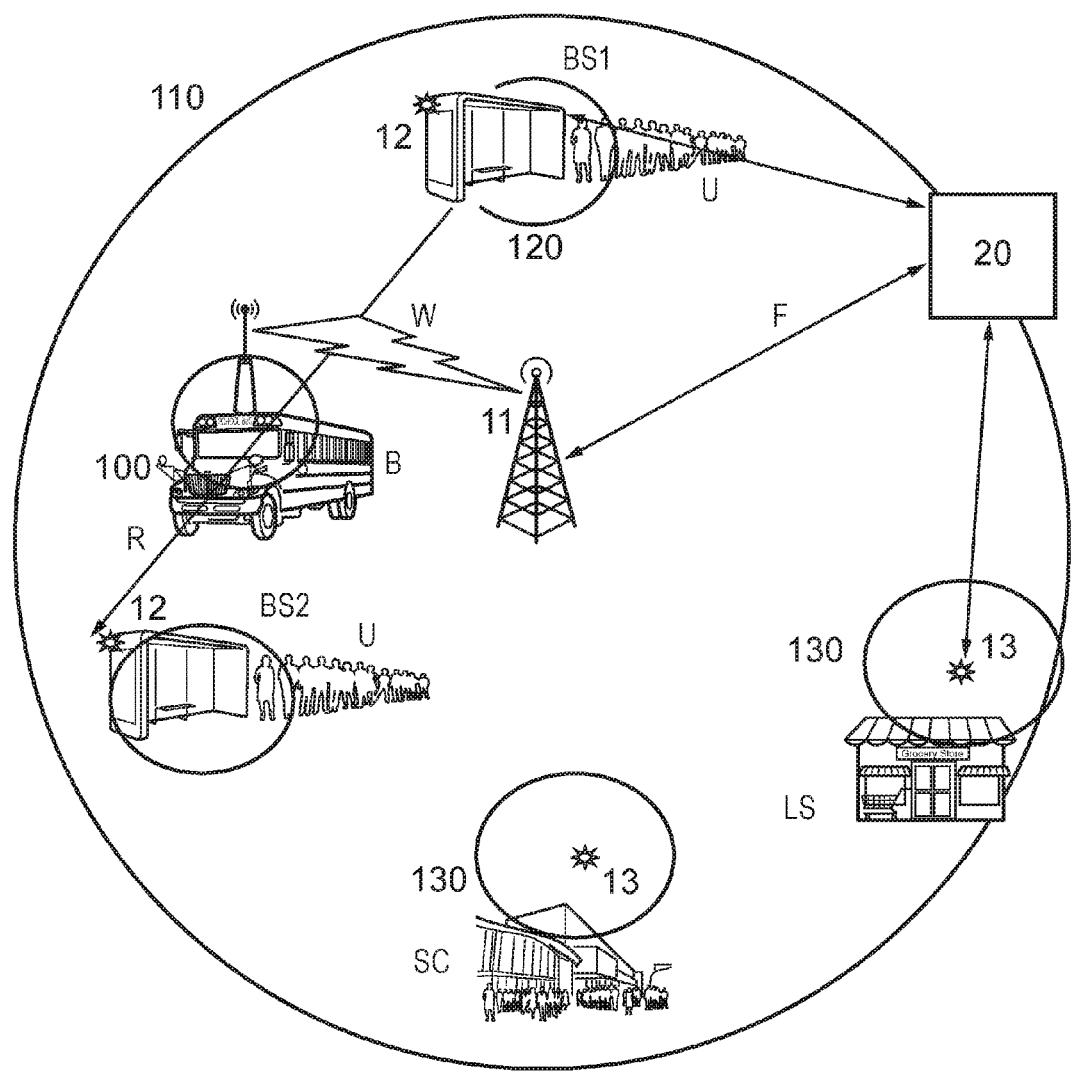
FIG. 1 shows a system architecture to which the present invention can be applied.

FIG. 1 shows a system architecture to which the present invention can be applied. It is assumed that there is a bus B travelling on a route (indicated in part by arrow R) between successive bus stops BS1, BS2. Users getting off the bus B are initially in the vicinity of BS1 or BS2, then may migrate elsewhere for example to a shopping centre SC or a local store LS.

The bus B is equipped with an in-vehicle femto eNB 10 having an exterior antenna for wireless communication (indicated at W) with a Macro eNB 11, and within the bus B, the eNB 10 provides a moving femto cell 100 for wireless communication with user devices of users travelling on the bus. The bus may be further equipped with at least one RFID reader for registering RFID devices as they pass in the vicinity of the reader. When installed on the bus doors, this provides a mechanism for recording exit and entry of users carrying an RFID tag (for example, installed in the user device).

The Macro eNB controls a macro cell 110, which for simplicity is assumed to cover the whole geographical area considered in FIG. 1 (in reality of course multiple overlapping macro cells would normally be present). Each bus stop BS1, BS2 has a bus stop eNB (fixed eNB) 12, each providing at least one small cell 120 respectively. Users U are waiting at each bus stop and, like the users on the bus B, will be using their mobile devices in general and receiving services via the bus stop eNBs 12. The shopping centre SC and local store LS likewise each have small cells 130 provided by respective fixed eNBs 13, serving users in their vicinity. The fixed eNBs can communicate with a central controller 20 via a fixed line connection denoted F (which could alternatively be a wireless connection in some cases). The moving eNB 10 can likewise communicate with the central controller 20 via wireless communication W with the Macro eNB 11. It is preferable (and assumed here for simplicity) that at least the small cells (moving and fixed) are operator-neutral, and therefore available for use by any of the users. The location of the central controller is not important but it could, for example, be co-located with a MME.

When the bus B arrives at bus stop BS2 for example, a number of users U get on/off the vehicle, which generates a large number of handovers of mobile devices (UEs) of those users, between the moving cell 100 on bus B and the outside macro and small cells 110, 120. Such handovers are referred to in this specification as "group handovers" although, as will be appreciated by those skilled in the art, the users need to be handed over individually (one by one) in practice, incurring a large signalling overhead as explained previously with respect to FIG. 7.

This problem becomes more serious especially at main bus stations or transport hubs where lots of passengers get on/off vehicles. Such bi-directional group handovers can lead to network congestion and degradation in users' quality of experience if the sudden surge in handover traffic cannot be accommodated by the network appropriately, or if the service delays due to handover exceed the tolerance limit of some delay-sensitive applications.

The traditional way a handover is done is based on UE's measurements on neighbouring cells' signal strength and handover is performed for each UE individually without considering the overall condition of the network. It is highly likely that UEs' measurements on signal strength will be similar to each other upon a bus reaching a bus stop. Therefore the handover decisions made for the group of UEs on the same bus may be the same, which will cause some cells in the network to be congested leading to high dropping call rate and some cells to be left underutilized resulting in waste of network resources.

In this scenario, embodiments of the present invention provide a resource management scheme to optimize the handover decisions made for a group of users that require handover at the same time, to overcome the drawback of the traditional signal strength-based handover mechanism. A resource management scheme is proposed that makes handover decisions for a group of users taking into account individuals' requirements on QoS, current context, and a holistic view of the system's traffic flows and available resources. The group handover decision making process is performed pre-emptively on the basis of prediction on the bi-directional HO traffic upon a bus arriving at a bus stop to improve the handover efficiency and meet many 5G applications' stringent requirements on latency.

In other words the present invention takes a group (and bidirectional) approach to managing handovers of individual UEs in order to take an overall view of what resources will be required, and what resources may be freed, in the target and source cells.

The focus of the proposed scheme is to consider the handovers when a moving cell arrives at a bus/train stop as a group problem and not as individual handovers. In this respect, a holistic view of the available resources is taken at the network controller level, which also considers the bi-directional flow of the users. However some form of prioritisation may still be needed in individual handover decisions. Some guidelines for this prioritisation are provided.

The present invention is applicable to public transport vehicles like buses, trams or trains, which have a pre-defined route, and stops or stations at known locations. The majority of the commuters in these vehicles are regular users and they have the same get-on and get-off stops. They mostly travel at the busy times for the transport network, and these are the times when the communication networks are also put under a lot of strain. Some of these users will furthermore be active users, in other words, will use their mobile devices for data or voice services inside the public transport vehicle and/or while waiting at a stop or station; these commuters are a particular target of the present invention. We assume the small cells (Femto eNBs) within the vehicles to be operator neutral, where they support all of the operators' consumers and also provide unlicensed spectrum services like WiFi. At busy times for the transport network, there will be multiple commuters getting off from the vehicle as well as multiple users getting on, at many of the stops.

Central Controller

Figures 2, 3:
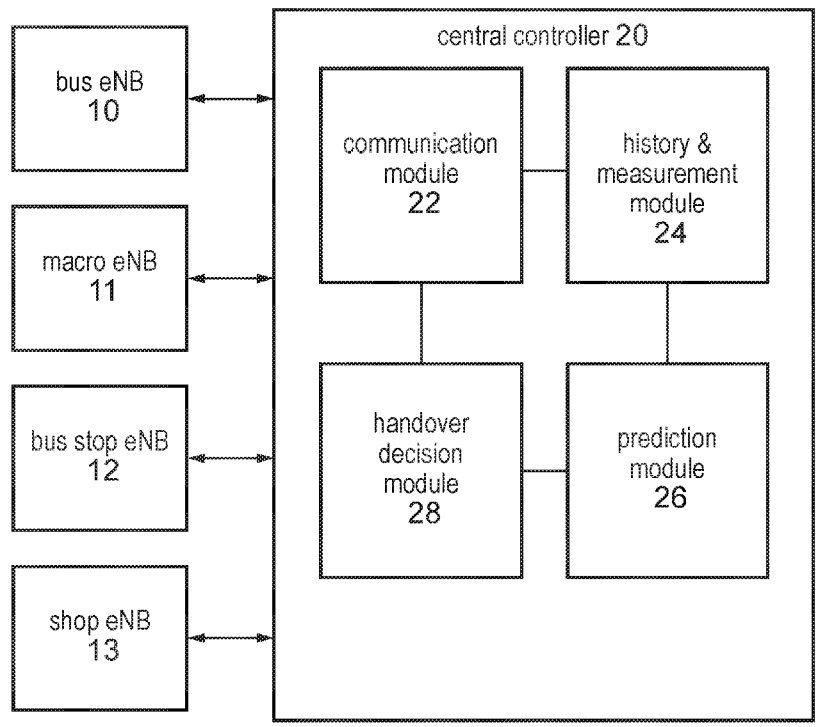
FIG. 2 schematically illustrates a central controller employed in embodiments of the present invention.
FIG. 3 schematically shows a history table compiled by the central controller of FIG. 2.

FIG. 2 schematically illustrates functional blocks of the central controller shown in FIG. 1. The central controller 20 is connected to receive data from, and provide instructions to, each of the eNBs (cells) shown in FIG. 1, namely each bus eNB 10 (moving cell), macro eNB 11 (macro cell), bus stop eNB 12 and shop eNB 13 (fixed small cells). Although only one of each type of cell is indicated for simplicity, in reality of course the central controller would be connected to many such cells, and multiple fixed cells may be available in the vicinity of each bus stop. The geographical coverage of the central controller would be, for example, at least one complete bus route, although it only has to focus on one public transportation vehicle and one stop (station) at a time. The central controller could potentially cover many public transportation routes or even an entire transportation network.

The central controller 20 includes a communications module 22, a history & measurement module 24, a prediction module 26, and a handover decision 28. The communication module 22 receives data from the eNBs and provides guidance or recommendations to eNBs such as handover decisions and resource allocation requirements. The history & measurement module 24 is responsible for building up and storing profiles of individual users in the manner described below. The prediction module 26 makes predictions of the likely future behaviour of individual users on the basis of the stored profiles and the current location of the bus. The handover decision module 28 aggregates the predictions of the prediction module 26 to assess how many handovers are likely to be required at each bus stop (in both directions: from moving to fixed cell and vice-versa) and causes the communication module 22 to issue instructions to the relevant eNBs accordingly.

Profiling Users

The first step is to build-up profiles of the users who regularly commute by bus (in this example). When active users camp onto the Femto cell of the bus B, they can be recognised by their unique user ID. When they move out (leave the bus B), that is registered as well. Active users within the vehicle are of particular interest, as handing them over while guaranteeing the QoS levels is the challenge. For these active users some profiling of their usage can be conducted. The in-vehicle Femto cells provide this information to a central controller, where the profiling is carried out by gathering several days' worth of data. The same commuters may use different vehicles of the fleet on a daily basis, but all these vehicles will have Femto eNBs connected to the central controller to provide this information. Similarly there will be small cells (operator neutral) at the bus/train stops which gather similar data and provide it to the central controller.

FIG. 3 illustrates the principle of profiling users based on past behaviour. It shows a table representing the kinds of information which can be gathered by eNBs and forwarded to the central controller. The first column of the table is a user ID which may be based on any ID available to the network, such as a TMSI (Temporary Mobile Subscriber Identity) of the user's mobile device (UE). Another form of ID which may be employed during the profiling process (preferably in addition to the TMSI or the like) is an RFID installed in the mobile device. In this way, profiles can also be associated with the UEs' individual RFIDs in addition to the ID(s) allocated by the mobile network. The mapping between the two types of ID can be based on users' behaviour information, such as when the user's UE connects and disconnects with the in-vehicle eNB, when the user gets on and gets off the bus, and what mobile services were used during the user's stay on the bus.

The second column identifies the cell (or eNB) to which the user has connected in a "session" having the start and end times shown in the third and fourth columns. During each session, the user may have used at least one network service such as checking e-mails, watching a video stream or playing an online game. The service(s) consumed during the session are likewise recorded in the $5^{th}$ column in the table.

A few example values for part of one morning's activity are shown in the table. For example, a first user "nnnnn" boards a bus and connects to moving cell B00001 at 8:25:32 one morning on the way to work. He leaves the bus at 8:55:13, checking his e-mails during the journey. The same user is recorded as then joining a fixed cell S00001 at the bus stop where he disembarked from the bus, and continues to browse e-mails during a session lasting until 9:20:39 at the bus stop.

Meanwhile, a second user "ppppp" boards the bus for which the moving cell ID is B00001, a few seconds after the first user, and uses the journey to watch a video stream. She has a longer journey than the first user; her session ends at 9:10:45 after which she joins the cell of a bus stop whose cell ID is S00002, further along the bus route. After leaving the bus, she no longer watches the video but leaves her mobile device in an on state ("connected").

A third user qqqqq joins the bus at the stop where the first user got off, and commences to play on online game. He leaves at the next stop with cell ID S00002 but is not recorded as joining that cell, presumably because he has turned off his mobile device (the reason for ending the session, such as handover or leaving the network, could also be recorded).

It should be noted that the above is only one example and other possibilities include adding session details from the macro eNB 11 and/or each stop eNB 12 to the table. Further data which could usefully be recorded by the central controller 20 include signal strengths measured by UEs inside the bus. For practical purposes, the central controller would not have any restrictions on storage capacity and so it would be feasible to build up profiles for many different users over months or even years. To maintain relevance, however, it may be preferred to give higher weight to more recent data in the profile. By contrast, it would not normally be necessary for the eNBs to store user behaviour data except on a temporary basis pending forwarding to the central controller.

It can be seen from the above that the profiling process enables the central controller to identify some patterns of commuter behaviour, both at an individual and on a group level. Particularly on commuter journeys, users tend to do the same things every working day. For example, it may be that user nnnnn always boards a bus at the same stop, usually spends his journey checking e-mails, and likes to stay connected at the destination bus stop. Meanwhile, another user such as ppppp might wants to use services whilst on the bus but not at other times. From such patterns, the central controller can establish the bi-directional commuter movement (some getting out and some getting in) at most of the bus stops/stations at busy times.

It will be noted that, for profiling purposes, the identity of the moving cell is of less importance than the identities of the fixed cells. Since different public transportation vehicles will normally serve the same route, it does not especially matter which specific vehicle is boarded by an individual user. It may therefore be sufficient simply to distinguish the moving cell as moving rather than fixed, and vehicles serving the same route could be grouped together for profiling purposes (on the basis of a common bus route number for example). On the other hand, the specific cell IDs of fixed cells available at places where the user enters or leaves the bus are of greater relevance, since normally these will stay the same for a given bus stop.

Generally, there will be multiple eNBs (including background Macro cells) available at the stops and the controller will have a holistic view of the available resources in these cells. This provides multiple options for the controller to assign resources to each UE. The proposed scheme also provides guidelines to optimize this resource transfer. Although the central controller can only predict each individual's behaviour, and each individual may not always act as predicted, the overall prediction can be accurate enough to be useful for facilitating handovers and resource allocation in the moving and fixed eNBs.

Group Handover

When sufficient knowledge about the commuters' UEs has been built up in the central controller, group handover procedures can be executed. The main focus of this process is to minimize the handover delays and ensure each UE is provided the appropriate level of resources to maintain their QoS.

Figure 4:
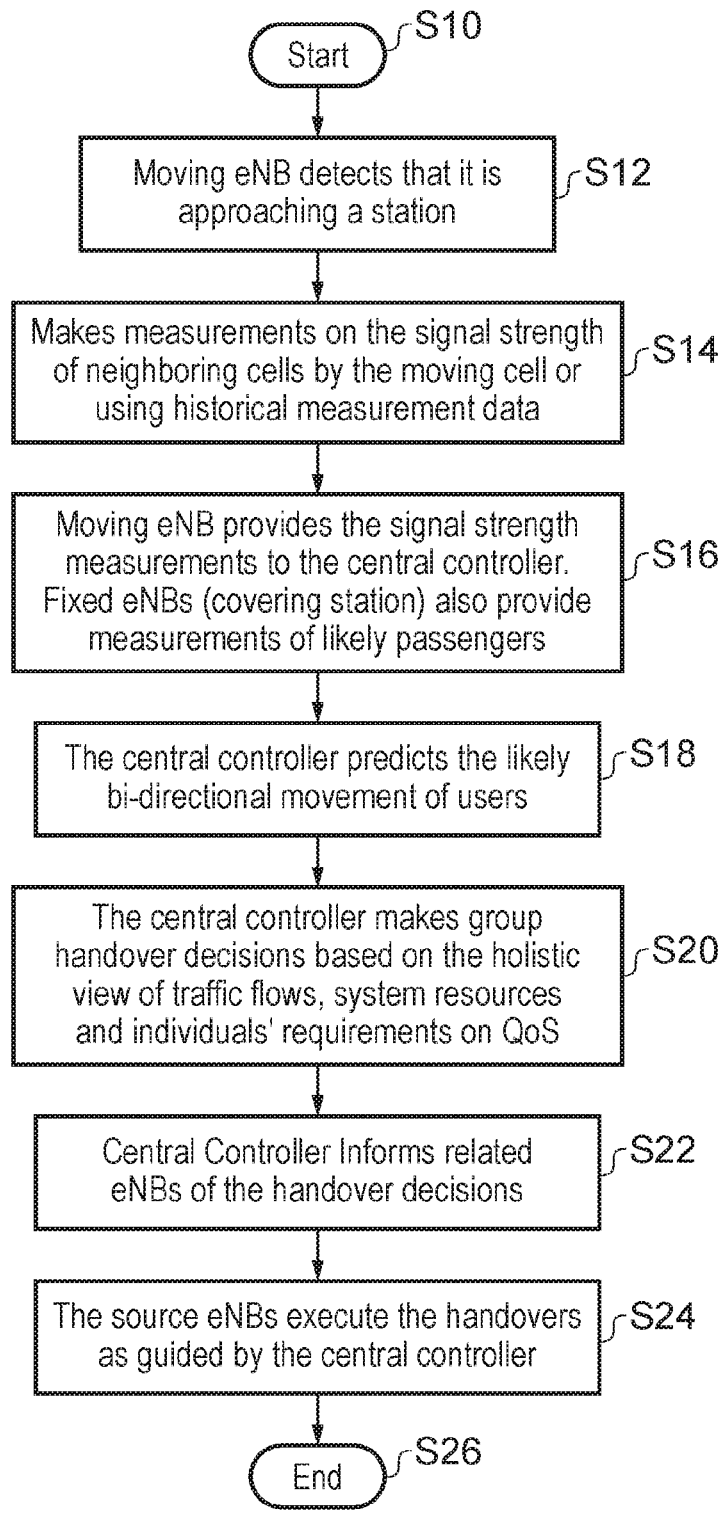
FIG. 4 is a flowchart of steps in a method embodying the present invention.

FIG. 4 is a flow chart of the main steps for the implementation of the proposed Group handover solution.

The process starts at S10.

In step S12, the bus eNB 10 detects that the bus is approaching the next bus stop. The bus and/or bus eNB may for example be equipped with a positioning system (such as GPS) and a map of the bus stops, to enable the eNB to know when the next stop is close. If it has not already done so, the bus eNB 10 supplies the central controller with user IDs of the current active users on the bus.

In step S14, the moving eNB uses its external antenna to make measurements on the signal strength of neighbouring cells, such as the fixed cell 120 of bus stop BS2. Alternatively, the central controller 20 can make use of historical data for this.

In S16 the moving eNB provides (if necessary) the signal strength measurements to the central controller 20. Meanwhile, the fixed eNB(s) at bus stop BS2 informs the central controller of the number of passengers waiting at the bus stop. (For present purposes, "likely passengers" means users of the wireless communication network waiting at the bus stop: other users having no active mobile device are of no interest).

In step S18 the central controller checks the user IDs against its database of stored profiles. It then predicts, based on the stored profiles of the users, which users are likely to get on and off the bus when it stops at the next stop (such as BS2 in FIG. 1). This step applies, of course, to users for which a stored profile exists. As for users for which no profile has yet been stored, these users can be handed over initially in a deterministic manner (waiting for measurement reports from the UE to trigger handover in the conventional way), but a profile for such users is gradually built up until the above prediction-based approach can take over. When the prediction algorithm decides there is enough prior knowledge with respect to a specific user, it will start including that user in its predictions. Thus, all users are handled but with a varying degree of reliance upon prediction.

In this way, the central controller 20 predicts how many users are expected to get off the bus when it reaches BS2 (i.e., disembark) and how many new passengers will get on (embark).

In S20 the central controller determines how many handovers are likely to be required as a result of the bidirectional movements predicted in S18. As already mentioned, "group handover" means a set of individual handovers.

In S22, the central controller 20 informs the relevant eNBs (in particular the moving eNB 10 and bus stop eNB 12) of the handover decisions reached in S22. The central controller does this whilst the bus B is still approaching bus stop BS2, allowing the eNBs to receive advance warning of the required handovers and the kinds of resource allocation to be required.

It should be understood that the above "handover decision" provides not a definite handover instruction, but rather, an indication/guidance for the involved cells about the potential bi-directional user movements that are about to occur. With this information the cells are better prepared to facilitate incoming active users as they are aware of the resources they will have after the bi-directional user movements. The eNBs do not necessarily have to follow the recommendation of the central controller with respect to specific UEs.

The guidance from the central controller can be provided when the moving cell enters the cell group (cluster of cells) serving the bus stop. This is before the bus/train actually stops, but is in the vicinity of the bus stop. When the moving cell enters the cluster, other Femto cells will identify it as a neighbour and will request the active users to produce signal measurement reports on this moving cell, in accordance with conventional behaviour.

In S24, the source eNBs (namely, moving eNB 10 and bus stop eNB 12) perform the required handovers under guidance of the central controller 20. It is not necessary to execute the handovers unconditionally: for example if a passenger who was expected to get off the bus does not in fact do so, the handover can be cancelled for that user. For example, RFID sensors on the bus doors could be used to uniquely identify UEs that pass by the doors when the doors are open. The identified UE IDs can then be sent to the in-vehicle eNB to allow it to confirm the execution of HO procedure according to the guidance provided by the central controller.

The process ends at S26, starting again when the bus B approaches the next stop.

Some of the above steps will now be described in more detail.

(i) Prediction of User Behaviour/UE Activity

The profiling of users allows the central controller to predict the user behaviour, more particularly to predict at which stations a user will get on and get off the vehicle. Also the controller can track the user behaviour after the handover has occurred, to record for example whether the user continues to consume the content or not. This information can be vital in determining the best handover policy for a group of users.

When a particular public transport vehicle nears a stop/station, the controller predicts how many users will get off, with the aid of the user profiles. The controller also has historical data about which destination cells are best suited to provide on-going services to the users. Of the current active users served by these 'destination' cells, the controller predicts who will get on to the arriving vehicle. Then the controller alerts both the in-vehicle Femto cell and the fixed Small/Macro cells serving the bus/train stop about the impending user transfers. In some cases, there will be multiple logical cells (as with Carrier aggregation in LTE-A) available, in which case the UEs can be handed over to multiple cells, with features like dual connectivity.

(ii) Steps to Speed Up the HO Process

For speed and efficiency, the handovers can be conducted as network initiated handovers. This is an alternative to UE measurement based handovers. If the serving (moving) cell finds that the measurements are delayed or there are a larger number of potential handovers than it could handle through the UE measurement method, it could opt for this method. Part of this method is providing the historical measurements (of the same location) to the controller or the destination cell: these are the UE measurements (from inside the vehicle) of the outside fixed cells, prior to handover. As these measurements will be more or less the same each time, the moving eNB can provide the historical values as current values in situations mentioned above.

A conventional handover, as explained earlier with respect to FIG. 7, requires the source eNB to request UE measurements for the neighbour cells to verify which neighbour cell suits best for handover. The method of the invention preferably uses measurements taken by the vehicular Femto eNB of the signal strengths of Fixed outside cells, or the historical signal strength measurements from the UEs to speed up the process. If the controller intends to handover to a Macro cell for example, the measurements provided by the in vehicle Femto eNB would be very much similar to the UE measurements themselves, so this could be an effective replacement. In the case of a fixed small cell in the station/stop taking over, the historical UE measurements recorded by the controller could be used instead. It may also be possible for historical UE measurement reports to be accumulated and stored locally in the vehicle eNB.

In a bus for example, all of the users leaving the bus at a particular stop will normally leave by the same exit door and then come into contact with the neighbour cell. Up to this point, they will be served by the moving cell. It is this measurement (at the exit point) that matters, which will be almost the same every time, even if individual users then disperse and later join different cells. This measurement can be provided to the controller or the destination cell in advance to speed up the handover.

Optionally, in some network deployments, the UE measurements could be entirely avoided, if the UEs make a handover which merely repeats the handover patterns of preceding mobiles (e.g. minutes before) in this location, or repeats handover patterns of the same UE on preceding days associated with a given location (for example). There may be new specifications in future, which allow the network to completely circumvent the UE measurements and reporting procedures for these "repetitive" handovers for which the handover pattern (i.e. the combination of source and destination cells) is always the same.

It will be noted that there is a risk in this approach of an inappropriate handover which does not necessarily reflect an individual UE's behaviour. However, if this occurs then the handover can be reversed and more appropriate action taken.

Figure 7:
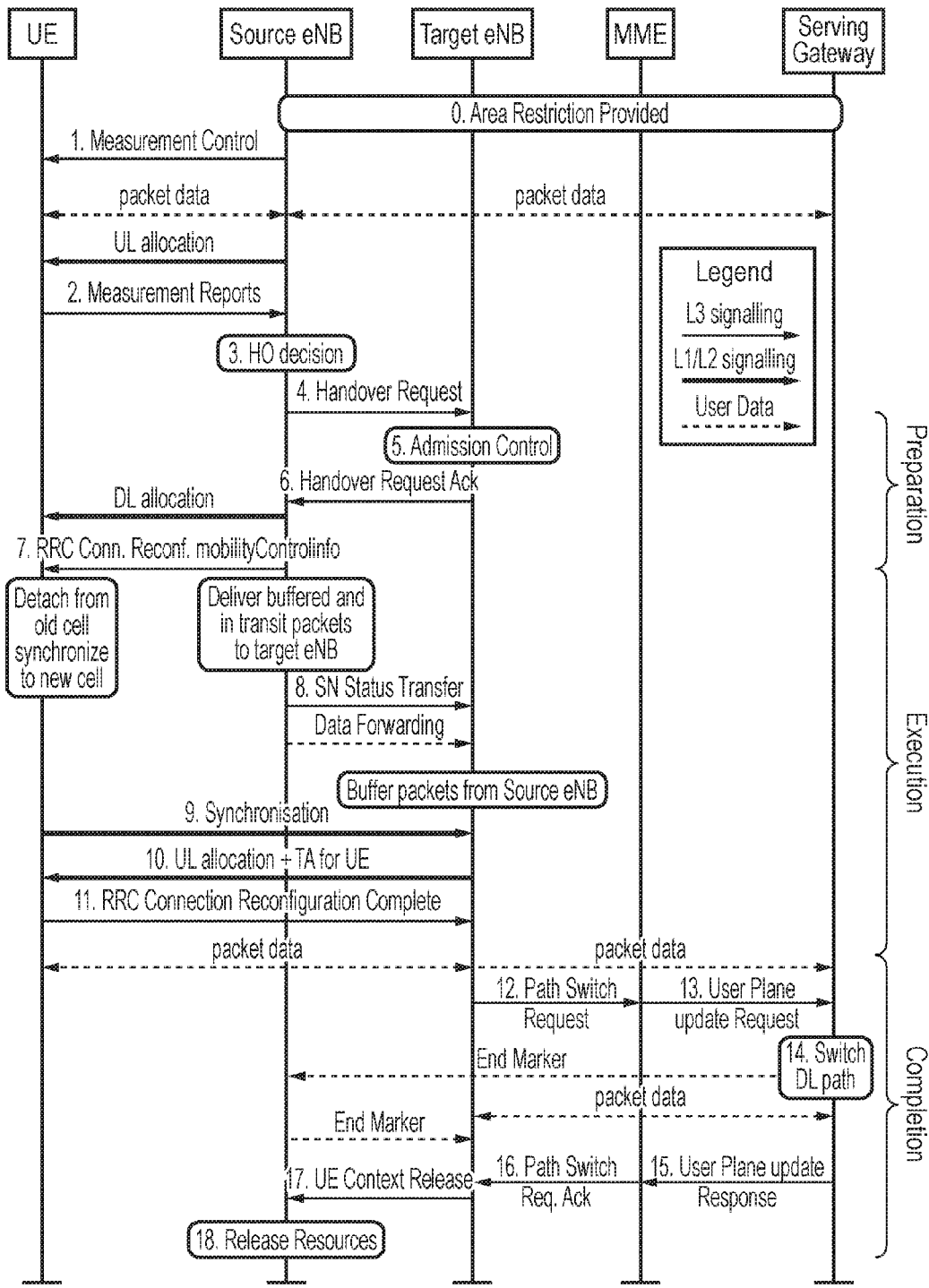
FIG. 7 shows a conventional handover procedure in LTE.

Regarding the detailed procedures for actually executing the handover, these can follow the kind of signalling sequence shown in FIG. 7, as it assumed that these procedures will not significantly change in 5G standards.

(iii) Accommodating the Bi-Directional Commuter (User) Flow

An important consideration in the present invention is the bi-directional commuter (user) flow at the bus/train stops. Accounting for this bi-directional flow in a holistic manner can provide more effective handover solutions. It enables eNBs to take-up active users (and their load), with the knowledge that there will be a certain amount of offloading (which will again be estimated and provided by the controller) occurring imminently.

The holistic view provided by the controller is crucial to make these bi-directional handovers a success. As noted before, there will be multiple fixed cell options (including background Macro cells) to accommodate the active users getting off the vehicle. The users waiting at the bus stop to get onto the vehicle will be connected to these multiple cells. Therefore, the central controller (by collecting information from a plurality of eNBs) will have a holistic view of the bi-directional flows likely to happen when the vehicle arrives at the stop/station, in a way which is not possible for any of the eNBs individually. The controller can instruct a certain fixed small cell to take up some load, while providing indications that a certain level of off-loading is imminent.

(iv) Criteria for User/Resource Allocation at Handover

Some examples will now be given of criteria which determine (from the central controller point of view) to which cell the UE should be handed over and what level of resource allocation will be needed.

As noted before, the handovers of multiple users can be handled in parallel as sufficient signalling channels are available. Most of the delay occurs in reporting measurements, which the present invention attempts to circumvent.

The physical handover of each user cannot be delayed, as when the users move out of the vehicle, they need to connect to a fixed cell or else the connection may drop. However, the amount of resources allocated to each user can be controlled, with fewer resources allocated to delay tolerant applications such as e-mail. Certain 5G users will be running delay critical applications with their devices and will be paying for a premium service. These type of users should be prioritized in destination cell and resource allocations. Application, service and user context can be used to determine priority and the level of resource allocations to 5G users.

Study of historical data on what a certain user does after getting off the vehicle (or after getting on) will be useful to determine the cell/resource allocation. For example, after getting off, some users stop viewing content and rapidly walk away. Some users stay on the station for another bus/train and continue to view the content. This kind of differentiation helps to prioritize the cell and resource allocations, and the type of cell (Macro or Small cell) the user should be connected to.

The type of application which a user is running will have a significant impact on the level of resource required. If a user in the vehicle is video streaming via the wireless communication network, he or she requires a large amount of resources immediately after handover to continue with the same QoS. On the other hand, a user downloading e-mails would not notice a few seconds delay, so the (bulk of) resource allocation in the fixed cell can be held up while the resources become available after off-loading in the opposite direction (i.e., from fixed to moving cell).

For continuation of providing some popular content, D2D options may be available at the bus/train stop or the vehicle (in the opposite direction flow). These kind of D2D 'donor UEs' can indicate their content store to the serving eNBs when camping on. This information can be passed on to the controller and can be used as guidance to offload some transition users from the cellular resources.

Figure 5:
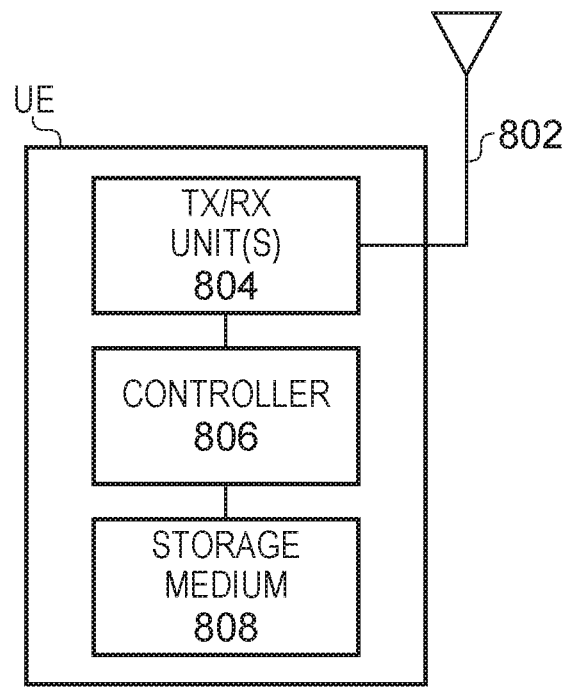
FIG. 5 is a block diagram illustrating an example of a UE 10 (terminal, mobile device) to which the present invention may be applied.

FIG. 5 is a block diagram illustrating an example of a UE (terminal, mobile device) to which the present invention may be applied. The UE may include any type of device which may be used in a wireless communication system described above and may include cellular (or cell) phones (including smartphones), personal digital assistants (PDAs) with mobile communication capabilities, laptops or computer systems with mobile communication components. The UE includes transmitter/receiver unit(s) 804 connected to at least one antenna 802 (together defining a communication unit) and a controller 806 having access to memory in the form of a storage medium 808. The controller may be, for example, a microprocessor, digital signal processor (DSP), ASIC, FPGA, or other logic circuitry programmed or otherwise configured to perform the various functions described above. For example, the various functions described above may be embodied in the form of a computer program stored in the storage medium 808 and executed by the controller 804. The transmission/reception unit 804 is arranged, under control of the controller 806, to perform functions such as receiving a handover command from an eNB and so forth as discussed previously.

Figure 6:
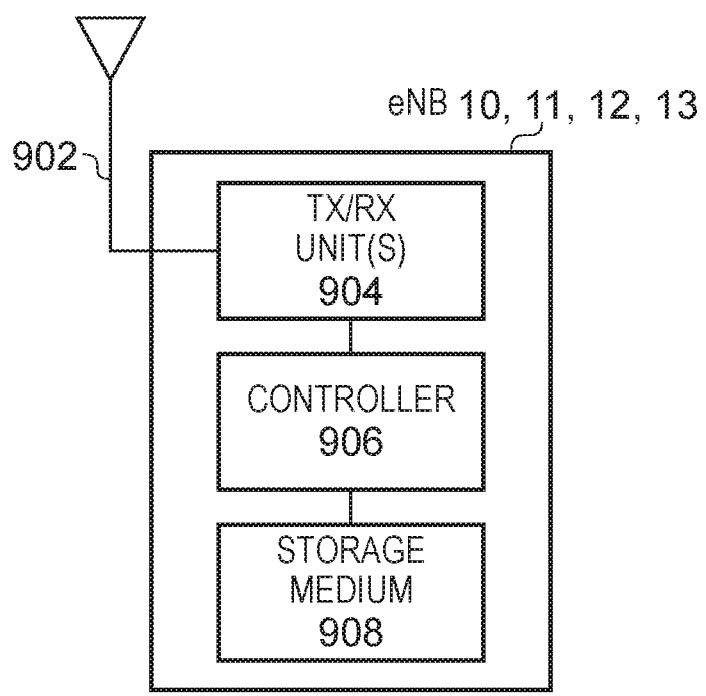
FIG. 6 is a block diagram illustrating an example of a BS/AP 20 to which the present invention may be applied.

FIG. 6 is a block diagram illustrating an example of an eNB 10, 11, 12 or 13 to which the present invention may be applied. The eNB includes transmitter/receiver unit(s) 904 connected to at least one antenna 902 (together defining a communication unit) and a controller 906. The controller may be, for example, microprocessor, digital signal processor (DSP), ASIC, FPGA, or other logic circuitry programmed or otherwise configured to perform various functions such as performing resource allocation (under network control) for the UEs which it serves. For example, the various functions described above may be embodied in the form of a computer program stored in the storage medium 908 and executed by the controller 906. The transmission/reception unit 904 is responsible for transmitting information such as data concerning UEs to the central controller, receiving guidance from the central controller concerning handovers and resource allocation, and so forth.

Various modifications are possible within the scope of the present invention.

For simplicity, the above description has assumed that a user's commute involves a single bus journey, but of course the principle of the invention can be extended to journeys involving a number of public transportation vehicles not necessarily of the same kind, for example a train journey followed by a bus journey.

The "fixed cells" referred to above may include logical or virtual cells.

Any of the embodiments mentioned above may be combined in the same system. In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

INDUSTRIAL APPLICABILITY

The invention allows efficient handover of mobile users travelling in public transportation vehicles, and contributes to reducing the load on a wireless communication network as well as to improving the QoS provided to users.

The invention claimed is:

1. A wireless communication system using cells to provide wireless access of users to services, comprising:
    a first base station installed on board a public transportation vehicle, to provide a moving cell;
    at least one second base station installed at a stop at which users enter or leave the public transportation vehicle, to provide one or more fixed cells; and
    a central controller for guiding handovers of users entering or leaving the public transportation vehicle;
    wherein the first and second base stations are arranged to provide data concerning users to the central controller, and the central controller is arranged to gather profile data of users based on the data provided by the base stations, make predictions about which users are likely to enter and leave the public transportation vehicle at the stop, and based on the predictions, to provide guidance to the first and second base stations for performing handovers of the users, and
    wherein the guidance includes a predicted number of handovers which will be needed from the moving cell to a fixed cell and from a fixed cell to the moving cell when users enter and leave the public transportation vehicle at the stop.

2. The wireless communication system according to claim 1, wherein the central controller is arranged to gather the profile data of users by recording details provided by the first and second base stations of wireless access of each user to the moving cell and/or fixed cells during a plurality of journeys using the public transportation vehicle.

3. The wireless communication system according to claim wherein said details include:
    at least one identity of a user;
    a time at which the user established a connection with the moving or fixed cells; and
    a time at which the user ended the connection with the moving or fixed cells.

4. The wireless communication system according to claim 3, wherein said details further include:
    information identifying a service or services which the moving or fixed cells provide to the user.

5. The wireless communication system according to claim 3, wherein the identity of the user includes at least one of:
    an identification (ID) code assigned to the user by the wireless communication system; and
    an ID code contained in a radio frequency identification (RFID), device of the user.

6. The wireless communication system according to claim 5, wherein said details further include:
    information identifying a service or services which the moving or fixed cells provide to the user.

7. The wireless communication system according to claim 1, wherein the guidance provided by the central controller includes an indication of resources predicted to be freed up from the moving cell and the fixed cells as a result of the predicted handovers.

8. The wireless communication system according to claim 1, wherein the guidance provided by the central controller includes at least one of:
    an indication of resource allocations predicted to be needed in the moving cell and the fixed cells after users have entered and left the public transportation vehicle at the stop; and
    an indication of which fixed cell will be selected as the handover target cell for a user leaving the public transportation vehicle.

9. The wireless communication system according to claim 8, wherein said details provided by the first and second base station include information identifying a service which the moving or a fixed cell provides to the user, the central controller is arranged to predict whether the user is likely to continue to require wireless access to the service after leaving or entering the public transportation vehicle, and the indication of selected handover target cell and/or indication of resource allocations takes into account resource demands of the service.

10. The wireless communication system according to claim 1, wherein the first base station is further arranged to update the central controller with the position of the public transportation vehicle and the central controller is arranged to provide said guidance prior to the public transportation vehicle reaching the stop.

11. The wireless communication system according to claim 1, wherein the first and second base stations are arranged to perform the handovers without requiring said handovers to be triggered by measurement reports from the users.

12. The wireless communication system according to claim 11, wherein the handovers are performed on the basis of one or more of:
    guidance from the central controller regarding which users are predicted to enter or leave the public transportation vehicle;
    recent handovers of other users during the same journey of the public transportation vehicle;
    past handovers of the same user during earlier journeys on the public transportation vehicle;
    measurements of the fixed cell by the first base station; and
    historical measurement reports of the users.

13. A central controller for wireless communication system using cells to provide wireless access of users to services, the wireless communication system comprising a first base station installed on board a public transportation vehicle, to provide a moving cell and at least one second base station installed at a stop at which users enter or leave the public transportation vehicle, to provide one or more fixed cells;

wherein the central controller is arranged to receive data concerning the users from at least the first base station, gather profile data of the users based on the data received, make predictions about which users are likely to enter and leave the public transportation vehicle at the stop, and based on the predictions, to provide guidance to the first and second base stations for performing handovers of the users; and wherein the guidance includes a predicted number of handovers which will be needed from the moving cell to a fixed cell and from a fixed cell to the moving cell when users enter and leave the public transportation vehicle at the stop.

14. A method of controlling a wireless communication system, the wireless communication system using cells to provide wireless access of users to services and comprising a first base station installed on board a public transportation vehicle to provide a moving cell and at least one second base station installed at a stop at which users enter or leave the public transportation vehicle, to provide one or more fixed cells, wherein the method comprises steps of:

receiving data concerning the users from at least the first base station;

gathering profile data of the users based on the data received;

making predictions about which users are likely to enter and leave the public transportation vehicle at the stop, and based on the predictions, providing guidance to the first and second base stations for performing handovers of the users, wherein the guidance includes a predicted number of handovers which will be needed from the moving cell to a fixed cell and from a fixed cell to the moving cell when users enter and leave the public transportation vehicle at the stop.

15. A non-transitory computer-readable medium embodying software which, when executed by a general-purpose computer connected to first and second base stations, causes the computer to provide the central controller according to claim 14.

* * * * *